A. B. D. LANG & J. A. POWELL.
APPARATUS FOR DISPLAYING ANNOUNCEMENTS, ADVERTISEMENTS, AND THE LIKE.
APPLICATION FILED OCT. 10, 1914.
1,173,360.
Patented Feb. 29, 1916.
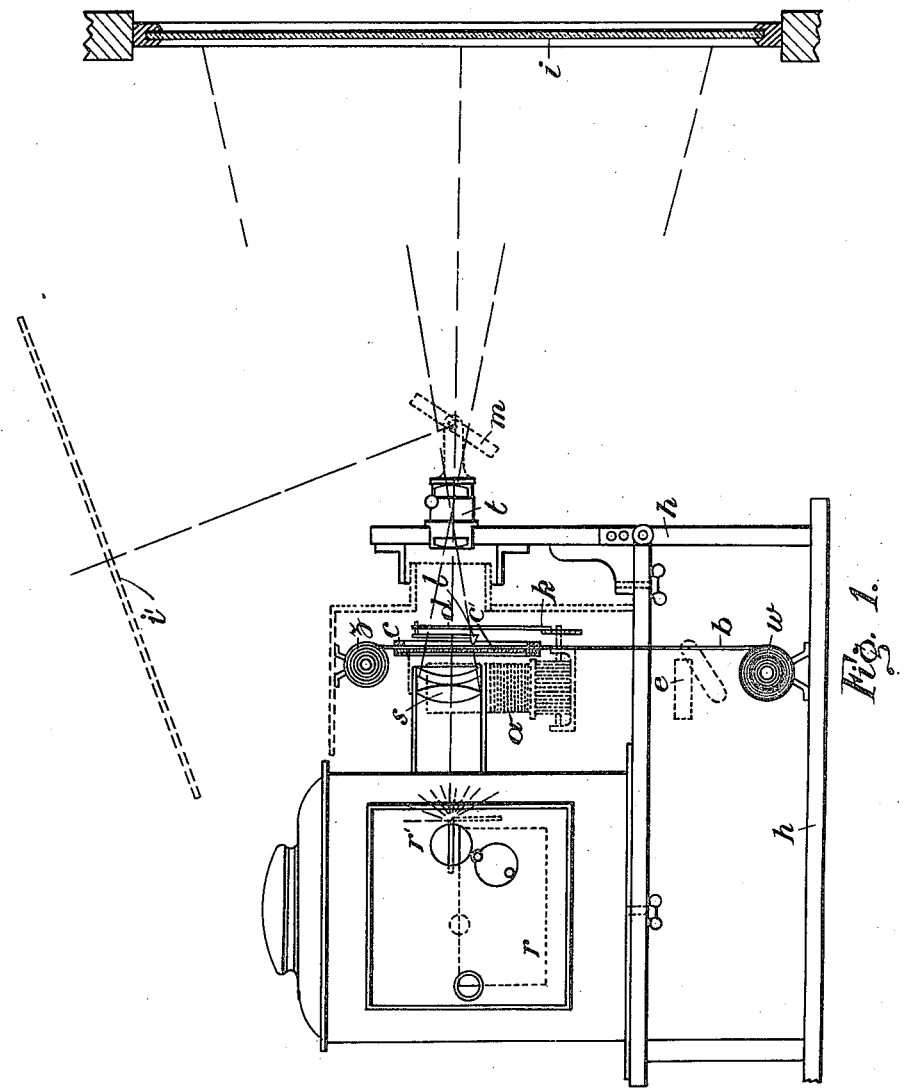
Augustus Bernard Dashwood Lang.
John Anthony Powell.
WITNESSES
INVENTORS
PER:
ATTORNEY.

UNITED STATES PATENT OFFICE.

AUGUSTUS BERNARD DASHWOOD LANG, OF GERRARD'S CROSS, BUCKINGHAM, AND JOHN ANTHONY POWELL, OF LONDON, ENGLAND, ASSIGNORS TO TELENEWS (1914) LIMITED, OF LONDON, ENGLAND, A JOINT-STOCK COMPANY.

APPARATUS FOR DISPLAYING ANNOUNCEMENTS, ADVERTISEMENTS, AND THE LIKE.

1,173,360.   Specification of Letters Patent.   Patented Feb. 29, 1916.

Application filed October 10, 1914. Serial No. 866,095.

*To all whom it may concern:*

Be it known that we, AUGUSTUS BERNARD DASHWOOD LANG and JOHN ANTHONY POWELL, subjects of the King of Great Britain, residing at Gerrard's Cross, Buckingham, and London, England, respectively, have invented new and useful Improvements in Apparatus for Displaying Announcements, Advertisements, and the like, of which the following is a specification.

This invention relates to improvements in apparatus in which announcements, pictures, and the like are exhibited on a screen; and the objects of our improvements are, first, to provide a device in which announcements, advertisements, drawings, and the like are produced at the apparatus itself and can be immediately thrown upon the screen as produced; secondly, to arrange that by the use of the well known tele-writer mechanism an announcement, or drawing may be transmitted automatically to a number of displaying points at the same time.

The apparatus by means of which this invention is carried out embraces the use of a telautograph machine (such for instance as that patented in America under No. 656,828 and known commercially as the "Telewriter") arranged with its writing point or tracing arms adapted to operate in the path of a shaft of light projected from a lantern containing a strong source of light, which is condensed by a suitable optical system, and projected on to a screen.

The invention consists in passing a strip of paper, of transparent or translucent nature, directly across the optical system of a projecting lantern, provision being made in the latter for the support of a transparent plate, or surface, between the lenses of the said system, and the actuating mechanism of the tracing arms of the telewriter, being disposed in a position adjoining the transparent plate, but so as not to appear in front of same except as regards the tracing arms, which write directly on the paper strip.

In the drawing accompanying this specification, Figure 1 is a view partly in section of a lantern and its optical system, with the telautograph mechanism applied thereto, the latter, not being claimed as new, being shown in dotted lines.

The telautograph apparatus shown in the above mentioned American patent is intended to be employed, the electro-magnets $a$ operating the levers $d$ being located one on either side of the transparent glass plate $c^1$, but below its surface level, the spindles actuating the lever arms $d$ being prolonged for their connection thereto as shown.

The pen $l$ is operated by the telautograph receiving mechanism which is operated from the transmitting station in the known manner, and writes on the paper strip $b$, which is drawn off the roll $w$ and on to the roll $z$, intermittently. The condenser $s$ of the optical system also occupies a space between the motors, while the lantern $r$ containing the source of light $r^1$ is placed behind them.

$e$ is a magnetic paper shifter of any known form which causes the strip $b$ to travel off the roll $w$ on to the roll $z$, in unison with the paper shifter at the transmitting station, both rolls being spring checked. The particular paper shifter we use in practice is illustrated and described with reference to Figs. 10, 11, 12, 13, of American Patent No. 656,828.

$h$ is a suitable framing for carrying various parts, and a screen $i$ opposite the apparatus receives the image projected by the optical system. The paper guide $c$ is carried upon partitions or brackets connected to the framing, while the tracing arm $d$ is connected to levers $k$ flexibly attached to the motor armatures in the ordinary way.

The mode of operation and action of the telewriter is well known; suffice it to state therefore that in use the tracing pen $l$ on the tracing arm $d$ inscribes upon the paper a reproduction of the original writing or design inscribed by the operator on the transmitter, and as the inscription on the paper band $b$ takes place in the illuminated area of the condenser $s$ an image of such inscription is projected by the objective lens $t$ on to the screen $i$. Thus, the inscription appears to the observer as though being made upon the screen itself.

The telewriter receiving mechanism is preferably arranged to trace the writing or drawing in an inverted position so that the image projected on the screen is seen erect or right way up from the far side of the screen; or the lantern optical system may include an erecting prism or lens system for arriving at the same result. Several receiving plates may be operated from one telewriter transmitting station.

Instead of the translucent screen $i$ the image may be thrown direct upon an opaque screen placed in front of the apparatus. It may be thrown in any other direction desired such as on to the screen $i^1$ by means of a reflector such as $m$ placed in front of the object lens.

What we claim as our invention and desire to secure by Letters Patent is:—

1. The combination, in apparatus for displaying announcements, advertisements, drawings, and the like, of an optical light-projecting system, a strip of translucent material, means for guiding and intermittently traversing the said strip between condensing and objective lenses of the said optical system, means for directly writing, printing, or drawing on the portion of said strip within the field of the light rays, and a screen receiving the projection of the said writing, printing, or drawing.

2. The combination, in apparatus for displaying announcements, drawings, and the like, of an optical light-projecting system, the receiving plate and tracing arm of a tele-writer or tel-autograph machine arranged between the condensing and objective lenses of the said system, a strip of translucent material guided across the said receiving plate, a magnetic paper shifter of known form operated by the tele-writer to shift the strip forward intermittently as required, tele-writer transmitting means of known form for causing the tracing arm to write, print, or draw, on the strip on the said receiving plate, and a screen receiving the projection of the said writing, printing, or drawing, all substantially as set forth.

3. In apparatus for displaying announcements, drawings, and the like, the combination of a lantern containing a strong source of light, condensing lenses attached thereto, objective lenses on the same principal axis as the condensing lenses, a tele-writer receiving mechanism and magnetic paper shifter, a framework having an adjustable support for the objective lenses and carrying the lantern the said tele-writer mechanism and the paper shifter so that the tele-writer mechanism is located between the condensing and objective lenses of the optical system, a strip of translucent material passing over the tele-writer receiving plate, and rollers supported by the said framework, one releasing and one automatically receiving the translucent strip carried thereby, substantially as described.

4. In apparatus for displaying announcements, drawings, and the like, the combination of a lantern containing a strong source of light, condensing lenses attached thereto, objective lenses on the same principal axis as the condensing lenses, a tele-writer receiving mechanism and magnetic paper shifter, a framework having an adjustable support for the objective lenses and carrying the lantern the said tele-writer mechanism and the paper shifter so that the tele-writer mechanism is located between the condensing and objective lenses of the optical system, a strip of translucent material passing over the tele-writer receiving plate, rollers supported by the said framework, one releasing and one automatically receiving the translucent strip carried thereby, an adjustable reflector transmitting an enlarged image of the writing or drawing in any desired direction, and a receiving screen coacting with the said reflector to receive the said image.

In testimony whereof we have signed our names to this specification in the presence of two subscribing witnesses.

AUGUSTUS BERNARD DASHWOOD LANG.
JOHN ANTHONY POWELL.

Witnesses:
H. D. JAMESON,
O. J. WORTH.